United States Patent [19]

Kenly, V et al.

[11] 4,234,800

[45] Nov. 18, 1980

[54] OZONE GENERATOR

[75] Inventors: William L. Kenly, V, Parsippany; William O. Grefe, West Paterson; Walter H. Lawrence, Hopatcong, all of N.J.

[73] Assignee: Pollution Control Industries, Inc., West Caldwell, N.J.

[21] Appl. No.: 7,557

[22] Filed: Jan. 29, 1979

[51] Int. Cl.³ .............................................. C01B 13/11
[52] U.S. Cl. ...................................... 250/540; 250/539
[58] Field of Search ........................ 250/539, 540, 541

[56] References Cited

U.S. PATENT DOCUMENTS

| | | | |
|---|---|---|---|
| 2,658,868 | 11/1953 | Collison | 250/539 |
| 3,364,129 | 1/1968 | Cremer et al. | 250/540 |
| 3,730,874 | 5/1973 | Trub | 250/540 |
| 3,766,051 | 10/1973 | Bollyky | 250/540 |
| 4,048,668 | 9/1977 | Van Bargen et al. | 250/539 |

FOREIGN PATENT DOCUMENTS 882293 9/1971 Canada .
52-34592 9/1977 Japan .

*Primary Examiner*—Deborah L. Kyle
*Attorney, Agent, or Firm*—Kenyon & Kenyon

[57] ABSTRACT

An ozone generator of simplified construction comprising a tubular first metallic electrode surrounded by a concentric tubular dielectric member having on its outer surface a second metallic electrode, the dielectric member being longer than the first electrode, and identical end members for slidably receiving and mounting the first electrode and the dielectric member to form an ozone generator, whereby compressive forces are borne by the first metallic electrode.

10 Claims, 2 Drawing Figures

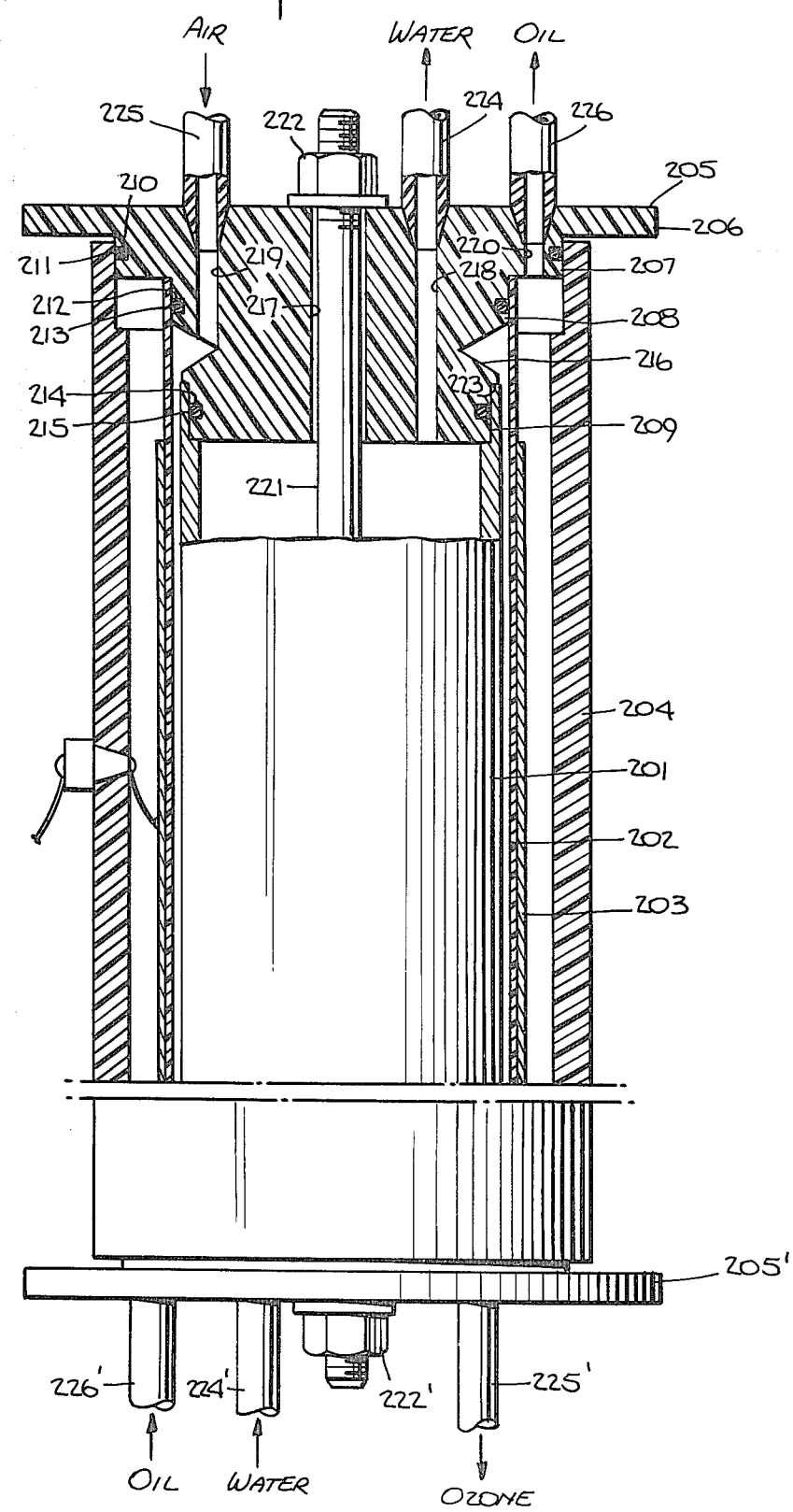

OZONE GENERATOR

This invention is concerned with ozone generators. More particularly, this invention pertains to an improved ozone generator module of simplified construction.

THE DRAWINGS

FIG. 2 is a side view, partly in cross-section, of a simplified modular ozone generator of this invention.

BACKGROUND

Figure 1:
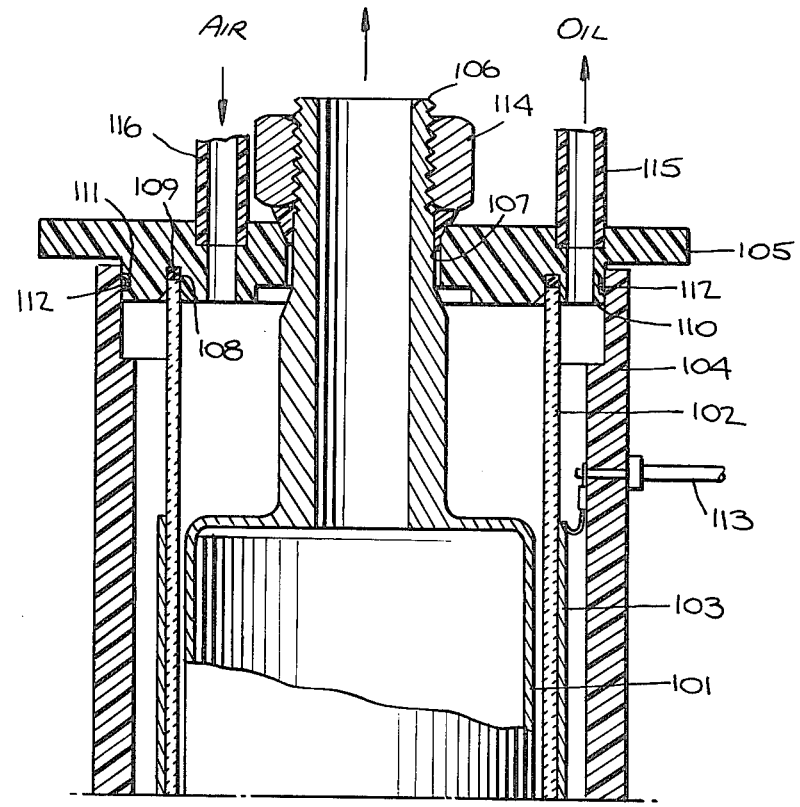
FIG. 1 is a side view, partly in cross-section, of a modular ozone generator of the prior art.
Figure 1:
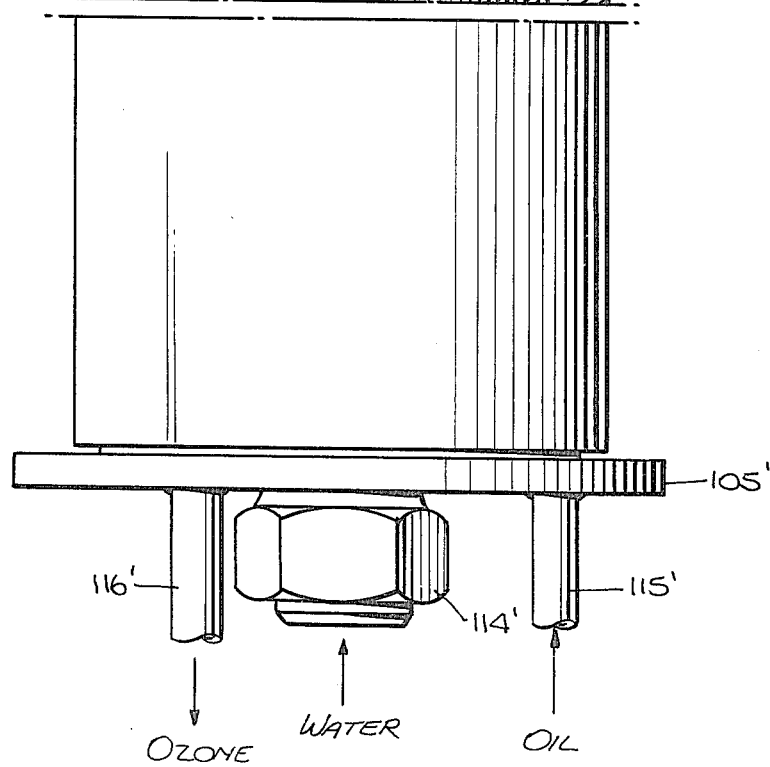

The use of ozone for purification and disinfection has become of ever increasing importance. The purification of drinking water with ozone has been a practice in Europe for some time, and more recently, ozone has been employed in this country as a substitute for chlorine as a disinfectant for tertiary process water in sewage disposal plants. As a consequence of the increased use of ozone, there has been an increased demand for equipment capable of more effectively generating ozone.

In general, the commercially available ozone generators comprise spaced-apart electrodes connected in an electric circuit to produce between them a high density electric discharge field, or "corona" discharge. An oxygen-containing gas, such as air, oxygen-enriched air or pure oxygen, is passed through the electric field, whereby a portion of the oxygen is converted to ozone.

The ozone generators in use today fall into three general classes. The first is the plate-type generator, wherein the electrodes are flat plates, whose opposed surfaces are coated with a dielectric, such as porcelain. Generators of this type are disclosed, for example in Netherlands Pat. No. 76,02690.

A second type comprises the so-called "iron-lung" generator, which is a generally cylindrical structure, wherein a glass tube closed at one end and coated on the inside surface with a conductor, is coaxially mounted in a metal cylinder. The corona discharge is established across the annulus between the outer surface of the glass tube and the inner surface of the metal cylinder. In practice, several of such assemblies are mounted horizontally in a tank, and water is circulated through the tank to cool the electrode assemblies.

Both of these generators are relatively inefficient because of the difficulty of cooling the gas stream in the corona discharge zone. Heat is generated as a consequence of the corona discharge, thereby heating the gas stream in the corona discharge zone. Ozone is thermally unstable and decomposes to oxygen. Consequently, efficient cooling of ozone generators is required to efficiently and economically produce ozone-containing streams having high ozone concentrations.

The third type of commercially available ozone generator is similar to the second type, in that generally coaxial tubular electrodes are employed. However, generators of this class differ in that the central electrode is metallic and the outer electrode is a glass cylinder whose outside surface is provided with a metallic coating. More importantly, both electrodes are cooled with circulating liquids, thereby reducing the loss of ozone due to thermal decomposition and providing a generator of improved efficiency. In general, the cooling fluid passed through the central metal electrode is water, while cooling oil is passed through a jacket surrounding the outer, metal-coated glass electrode. Alternatively, the unjacketed electrode assemblies can be immersed in an oil filled tank. Ozone generators of this type are disclosed, for example, in U.S. Pat. No. 3,766,051.

Commercial generators based upon the last mentioned concept have been manufactured in modular form as illustrated in FIG. 1, and consist of hollow cylindrical metallic electrode 101, glass cylinder 102, having on its outer surface metallic coating 103 and, optionally, a cylindrical dielectric, e.g. plastic, jacket 104 and identical end plates 105 and 105'. Each end of electrode 101 is provided with a threaded extension, e.g., extension 106, which projects through axial hole 107 in end plate 105. Each end of glass cylinder 102 fits into an annular recess in its corresponding end plate, e.g., circular groove 108 in end plate 105, containing O-ring 109 for effecting a fluid-tight seal between the end of cylinder 102 and end plate 105. Each end of jacket 104 fits over cylindrical projections on the corresponding end plate, e.g., projection 110 in the face of end plate 105. Projection 110 has circumferential groove 111, containing O-ring 112 to provide a fluid-tight seal between jacket 104 and end plate 105. Central electrode 101 is grounded, and a high voltage conductor 113 is fed through the wall of jacket 104 and placed in electrical contact with the metal coating 103 of glass cylinder 102. The module is secured by nuts 114 and 114' which are threaded on the threaded extensions, e.g., extension 106, of metal electrode 101. A liquid coolant, preferably water, is fed through the core of metal electrode 101 and another liquid coolant, preferably oil, is fed through the annulus between glass cylinder 102 and jacket 104 via ports 115 and 115' in end plates 105 and 105'. An oxygen-containing gas is passed through the annulus between metal electrode 101 and glass cylinder 102 through ports 116 and 116' in end plates 105 and 105'. The gas is fed countercurrently to the cooling fluids; thus air or other relatively ozone-free, oxygen-containing gas is fed into the generator through port 116 and an ozone-containing stream is removed from port 116', while the cooling fluids are fed to the generator through extension 106' and port 115', and withdrawn through extension 106 and port 115.

As will be evident from the foregoing, the ozone generator module of the prior art requires machining the end plates to close tolerances, and the longitudinal dimensions of the central electrode, the glass cylinder and even the outer jacket must be held within relatively close tolerances. In particular, if the glass cylinder is too long, it may be shattered when compressed during assembly of the module. On the other hand, if it is too short, a fluid-tight seal might not be obtained and coolant may leak from the annulus between glass cylinder 102 and jacket 104 into the corona discharge zone.

THE INVENTION

It is an object of this invention to provide an improved ozone generator of this third class.

It is a further object of this invention to provide an ozone generator which is simpler and more economical to construct.

In accordance with this invention, a modular ozone generator comprising a first, central, fluid-cooled tubular metal electrode, an intermediate, tubular dielectric material having on its outer surface a second metal electrode, and an outer tubular dielectric jacket, and two end members, is provided which is of extremely simplified construction, as shown in FIG. 2. For reasons of simplicity, the various tubular members are preferably cylindrical, although other forms can be employed if desired. In the discussion which follows, cylindrical members will be discussed. Thus, the module of this invention comprises metal cylinder 201, dielectric cylinder 202 having on its outer surface metal electrode 203, and dielectric cylinder 204, each cylinder being of increasing diameter and longitudinal dimension, and duplicate end members 205 and 205'.

Each end member is preferably a unitary member, but it can be considered as being formed of a series of cylinders of decreasing diameter mounted on the face of a base plate. For example, with specific reference to end member 205, each end member comprises a base plate 206, which may be round, square or of other desired configuration, having mounted thereon a series of coaxial cylinders of decreasing diameter 207, 208 and 209. Cylinder 207 is mounted on the inner face of end plate 206 and has a diameter approximating the inner diameter of jacket 204, and slidably receives jacket 204. Cylinder 207 has in its outer circumferential surface or side wall circumferential groove 210 containing O-ring 211 for effecting a fluid-tight seal between the side wall of cylinder 207 and the inner surface of outer dielectric jacket 204. Cylinder 208 is mounted on the inner face of cylinder 207, and it has a diameter approximating the inside diameter of dielectric cylinder 202, and slidably receives cylinder 202. Cylinder 208 contains in its outer circumferential surface or side wall circumferential groove 212 for receiving O-ring 213 for effecting a fluid-tight seal between the side wall of cylinder 208 and the inside surface of dielectric cylinder 202. The difference in the diameters of cylinder 207 and 208 is selected to provide an annular coolant chamber between dielectric cylinder 202 and jacket 204. Cylinder 209 is mounted on the inner face of cylinder 208, and it has a diameter approximating the inside diameter of metal electrode 201. Cylinder 209 slidably receives metal electrode 201 and its outer circumferential surface or side wall is provided with circumferential groove 214 and O-ring 215 to provide a fluid-tight seal between the side wall of cylinder 209 and the inner surface of electrode 201. The differences in the diameters of cylinders 208 and 209 are selected to provide a corona discharge or ozone generation annulus between inner metallic electrode 201 and dielectric 202.

Each end member is provided with circumferential groove 216 at the base of cylinder 209 which serves as a gas distribution channel in communication with the corona discharge and ozone generation annulus between cylinders 201 and 202.

Each end member is provided with four passages 217, 218, 219 and 220 communicating between the outside face and inside face of the end member. Passage 217 is axially positioned for receiving assembly rod 221. Rod 221 is threaded at each end, and the module is secured with nuts 222 and 222'. Cylinder 209 of end plate 205 is provided with land 223 for abutting the end of metal electrode 201. The longitudinal dimensions of metal electrode 201, dielectric cylinders 202 and 204, and the heights of cylindrical projections 207 and 208 and land 223 are selected so that on assembly of the generator a substantial compressive force is applied only to metal electrode 201. At least dielectric cylinder 202, and preferably dielectric jacket 204 as well, is thus free to slide longitudinally and is not subjected to compressive forces.

Passage 218 is radially outwardly disposed from passage 217 and terminates in the outer face of end member 206 and the inner face of cylinder 209 for communication between the hollow core of metal electrode 201 and the outside of the module of this invention through tube 224. It thus provides a conduit for the introduction and removal of cooling fluid, preferably water, for metal electrode 201.

Passage 219 is radially disposed outwardly from passage 218, and communicates between groove 216 and the outer face of end member 206, and in cooperation with tube 225, provides a passage for the introduction of oxygen-containing gas into and the removal of ozone-containing gas from the corona discharge and ozone generating zone formed between electrode 201 and dielectric 202.

Finally, passage 220 is radially outwardly disposed from passage 219, and communicates between the inner surface of cylinder 207 and the outer surface of end member 206, and, in cooperation with tube 226, provides a channel for the introduction and removal of cooling fluid, preferably oil, to and from the annulus between second electrode 203 and dielectric jacket 204.

In the fully assembled module, end members 205 and 205' are preferably rotated 180° with respect to the location of the ports. Cooling fluids, preferably water and oil, are fed respectively through tubes 224' and 226' and withdrawn through tubes 224 and 226. Air or other oxygen-containing gas is fed counter-currently to the cooling fluids through tube 225, then to groove 216 and into the corona discharge annulus, where oxygen in the gas is converted into ozone. Ozone-containing gas is then removed from the corona discharge zone through a groove in end member 205' corresponding to groove 216 and then through port 225'.

It will be seen that the end members of the generator of this invention are simpler to manufacture and use than are the end members of the prior art module. They are easily formed by turning on a lathe, whereas the end members of the prior art module required expensive machining of grooves in the face of the end member. Furthermore, the electrodes and dielectric jacket of the module of this invention are simple cylinders, whose dimensions are less critical than the dimensions of the corresponding components of the prior art module. Finally, the longitudinal dimension of the dielectric tube which supports the second electrode is such that no longitudinal compressive force is applied in assembling the ozone generator module, thus avoiding the risk of breakage of the dielectric.

The ozone generator of this invention is readily constructed of materials known to those of ordinary skill in the art. The central metallic electrode may be constructed of any conductive material having suitable resistance to oxygen and ozone, and preferably is made of stainless steel. The second electrode is made of any suitable dielectric, which is ozone resistant, nonporous, dimensionally stable, capable of supporting a strong electric field, and can withstand elevated pressures. It preferably is constructed of glass or a ceramic such as porcelain. The outer electrode is preferably a metallic film, e.g., a film of silver, copper, or aluminum, deposited on the outer surface of the dielectric tube, although metal foils, screens, and the like can be employed if desired. The end plates may be constructed of any rigid, ozone-resistant material, preferably metals such as stainless steel or aluminum, although synthetic polymeric materials such as poly(vinyl chloride), ethylene-propylene rubber, silicone rubber, and the like may be employed. When the outer dielectric member is employed, it may be formed from any suitable dielectric material, with synthetic polymers such as poly(vinyl chloride) being preferred.

What is claimed is:

1. In an ozone generator comprising an inner tubular metallic electrode, an outer electrode comprising a tubular dielectric having on its outer surface an outer metal electrode, said dielectric and said inner electrode defining a corona discharge ozone generation zone, and means for contacting the outer surface of said outer electrode with a cooling fluid, and two end members cooperating with said inner and outer electrodes to form a unitary module, the improvement wherein:
   (a) The longitudinal dimension of said outer tubular dielectric is greater than the longitudinal dimension of said tubular metallic electrode;
   (b) Each of said end members comprises an end plate having:
      (1) On the inner surface thereof a first projection for receiving in slidably engaging, fluid-tight contact said tubular dielectric;
      (2) On the inner surface of said first projection, a second projection for receiving in slidably engaging fluid-tight contact said inner electrode;
      (3) The side wall of said second projection being provided with a circumferential recess extending therearound, and in fluid communication with the annulus between said inner electrode and said dielectric;
   (c) Said end member being further provided with:
   (1) A passage extending from said circumferential recess to the outer face of said end member for transmitting oxygen-containing gas between said annulus and the outside of said module; and
   (2) A passage extending from the inner face of said projection to the outer face of said end member for transmitting cooling fluid between the core of said inner cylinder and the outside of said module.
   (d) Means for securing end members being secured by applying to said members an axial compressive force, the axial dimensions of said end members, said tubular metallic electrode and said outer tubular dielectric being such that substantially all of said axial compressive force is applied to said tubular metallic electrode and said tubular dielectric is free to slide longitudinally and is not subjected to said axial compressive force.

2. A generator according to claim 1 wherein each of said end members is made of metal.

3. A generator according to claim 2 including a coaxial external dielectric jacket forming with the outer surface of said outer electrode an annular chamber for containing cooling fluid for said outer electrode, including:
   (a) Means on said end member for receiving in slidably engaging, fluid-tight contact said dielectric jacket; and
   (b) A passage in said end member extending from said annular chamber and the outside surface of said end member for transmitting a cooling fluid between said annular chamber and the outside of said module.

4. A generator according to claim 3 wherein said electrodes and said dielectric jacket are cylinders.

5. A generator according to claim 2 wherein said electrodes and dielectric are cylinders.

6. A generator according to claim 1 wherein the means for applying said axial compressive force comprises a longitudinally extending member located within said inner tubular metallic electrode extending through holes in each of said end members and beyond said end members, said longitudinally extending member provided with means cooperating with said longitudinally extending member and said end members to apply an axial compressive force to said end members and said inner tubular metallic electrode.

7. A generator according to claim 6 wherein each of said end members is a unitary member which is made of metal.

8. A generator according to claim 7 including a coaxial external dielectric jacket forming with the outer surface of said outer electrode an annular chamber for containing cooling fluid for said outer electrode, including:
   (a) Means on said end member for receiving in slidably engaging, fluid-tight contact said dielectric jacket; and
   (b) A passage in said end member extending from said annular chamber and the outside surface of said end member for transmitting a cooling fluid between said annular chamber and the outside of said module.

9. A generator according to claim 7 wherein said electrodes and dielectric are cylinders.

10. A generator according to claim 9 wherein said electrodes and said dielectric jacket are cylinders.

* * * * *